(12) United States Patent
Spiegel et al.

(10) Patent No.: US 7,116,669 B1
(45) Date of Patent: *Oct. 3, 2006

(54) FORMAT FOR AUTOMATIC GENERATION OF UNIQUE ATM ADDRESSES USED FOR PNNI

(75) Inventors: Ethan Spiegel, Mountain View, CA (US); Ashok Chippa, San Jose, CA (US); Marek Tomaszewski, Fremont, CA (US); Anthony Alles, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 835 days.

This patent is subject to a terminal disclaimer.

(21) Appl. No.: 09/852,755

(22) Filed: May 9, 2001

Related U.S. Application Data

(62) Division of application No. 08/876,952, filed on Jun. 17, 1997, now Pat. No. 6,862,284.

(51) Int. Cl.
*H04L 12/28* (2006.01)

(52) U.S. Cl. .................................. 370/395.1

(58) Field of Classification Search ............ 370/395.1–395.32; 709/220–222, 245
See application file for complete search history.

(56) References Cited

U.S. PATENT DOCUMENTS

| | | |
|---|---|---|
| 4,131,767 A | 12/1978 | Weinstein |
| 4,161,719 A | 7/1979 | Parikh et al. |
| 4,316,284 A | 2/1982 | Howson |
| 4,397,020 A | 8/1983 | Howson |
| 4,419,728 A | 12/1983 | Larson |
| 4,424,565 A | 1/1984 | Larson |
| 4,437,087 A | 3/1984 | Petr |
| 4,438,511 A | 3/1984 | Baran |

(Continued)

FOREIGN PATENT DOCUMENTS

EP 0 384 758 A2 2/1990

(Continued)

OTHER PUBLICATIONS

Alles, ATM Internetworking, Cisco System Inc, pp. 1-58, 1995.*

(Continued)

*Primary Examiner*—Frank Duong
(74) *Attorney, Agent, or Firm*—Blakely, Sokoloff, Taylor & Zafman LLP

(57) ABSTRACT

The invention provides a method and system for providing unique ATM End System Addresses, in which each new device is assigned a unique address in an ATM network while allowing all new devices performing the PNNI protocol in a selected set (such as all those from a single manufacturer) to be assigned by default to the same peer group. In the invention, a first portion of the ATM address (from which the default peer group ID is determined) is by default configured to equal a selected value unique to the manufacturer (or another selected class of devices), which assures that all devices from the same manufacturer (or in that selected class) are by default configured in the same peer group for PNNI protocol purposes, while a second portion of the ATM address (comprising a switch number ID) and a third portion of the ATM address (comprising a device number ID) are by default both configured to equal a unique value for the device (such as a MAC address), which assures that each device is configured with a unique ATM address. The third portion of the ATM address may alternatively be determined using a different method, so long as selection of the third portion causes each device to be assigned a unique ATM address by default.

22 Claims, 1 Drawing Sheet

U.S. PATENT DOCUMENTS

| | | | |
|---|---|---|---|
| 4,439,763 A | 3/1984 | Limb | |
| 4,445,213 A | 4/1984 | Baugh et al. | |
| 4,446,555 A | 5/1984 | Devault et al. | |
| 4,456,957 A | 6/1984 | Schieltz | |
| 4,464,658 A | 8/1984 | Thelen | |
| 4,499,576 A | 2/1985 | Fraser | |
| 4,506,358 A | 3/1985 | Montgomery | |
| 4,507,760 A | 3/1985 | Fraser | |
| 4,532,626 A | 7/1985 | Flores et al. | |
| 4,644,532 A | 2/1987 | George et al. | |
| 4,646,287 A | 2/1987 | Larson et al. | |
| 4,677,423 A | 6/1987 | Benvenuto et al. | |
| 4,679,189 A | 7/1987 | Olson et al. | |
| 4,679,227 A | 7/1987 | Hughes-Hartogs | |
| 4,723,267 A | 2/1988 | Jones et al. | |
| 4,731,816 A | 3/1988 | Hughes-Hartogs | |
| 4,750,136 A | 6/1988 | Arpin et al. | |
| 4,757,495 A | 7/1988 | Decker et al. | |
| 4,763,191 A | 8/1988 | Gordon et al. | |
| 4,769,810 A | 9/1988 | Eckberg, Jr. et al. | |
| 4,769,811 A | 9/1988 | Eckberg, Jr. et al. | |
| 4,771,425 A | 9/1988 | Baran et al. | |
| 4,819,228 A | 4/1989 | Baran et al. | |
| 4,827,411 A | 5/1989 | Arrowwood et al. | |
| 4,833,706 A | 5/1989 | Hughes-Hartogs | |
| 4,835,737 A | 5/1989 | Herrig et al. | |
| 4,879,551 A | 11/1989 | Georgiou et al. | |
| 4,893,306 A | 1/1990 | Chao et al. | |
| 4,903,261 A | 2/1990 | Baran et al. | |
| 4,922,486 A | 5/1990 | Lidinsky et al. | |
| 4,933,937 A | 6/1990 | Konishi | |
| 4,960,310 A | 10/1990 | Cushing | |
| 4,962,497 A | 10/1990 | Ferenc et al. | |
| 4,962,532 A | 10/1990 | Kasiraj et al. | |
| 4,965,767 A | 10/1990 | Kinoshita et al. | |
| 4,965,772 A | 10/1990 | Daniel et al. | |
| 4,970,678 A | 11/1990 | Sladowski et al. | |
| 4,979,118 A | 12/1990 | Kheradpir | |
| 4,980,897 A | 12/1990 | Decker et al. | |
| 4,991,169 A | 2/1991 | Davis et al. | |
| 5,003,595 A | 3/1991 | Collins et al. | |
| 5,014,265 A | 5/1991 | Hahne et al. | |
| 5,020,058 A | 5/1991 | Holden et al. | |
| 5,033,076 A | 7/1991 | Jones et al. | |
| 5,033,595 A | 7/1991 | Pardee | |
| 5,034,919 A | 7/1991 | Sasai et al. | |
| 5,054,034 A | 10/1991 | Hughes-Hartogs | |
| 5,059,925 A | 10/1991 | Weisbloom | |
| 5,072,449 A | 12/1991 | Enns et al. | |
| 5,088,032 A | 2/1992 | Bosack | |
| 5,095,480 A | 3/1992 | Fenner | |
| RE33,900 E | 4/1992 | Howson | |
| 5,115,431 A | 5/1992 | Williams et al. | |
| 5,115,495 A | 5/1992 | Tsuchiya et al. | |
| 5,119,367 A | 6/1992 | Kawakatsu et al. | |
| 5,128,926 A | 7/1992 | Perlman et al. | |
| 5,128,945 A | 7/1992 | Enns et al. | |
| 5,136,580 A | 8/1992 | Videlock et al. | |
| 5,166,930 A | 11/1992 | Braff et al. | |
| 5,189,662 A | 2/1993 | Kleine-Altekamp | |
| 5,199,049 A | 3/1993 | Wilson | |
| 5,206,886 A | 4/1993 | Bingham | |
| 5,208,811 A | 5/1993 | Kashio et al. | |
| 5,212,686 A | 5/1993 | Joy et al. | |
| 5,224,099 A | 6/1993 | Corbalis et al. | |
| 5,226,120 A | 7/1993 | Brown et al. | |
| 5,228,062 A | 7/1993 | Bingham | |
| 5,229,994 A | 7/1993 | Balzano et al. | |
| 5,233,604 A | 8/1993 | Ahmadi et al. | |
| 5,237,564 A | 8/1993 | Lespagnol et al. | |
| 5,241,682 A | 8/1993 | Bryant et al. | |
| 5,243,342 A | 9/1993 | Kattemalalavadi et al. | |
| 5,243,596 A | 9/1993 | Port et al. | |
| 5,247,516 A | 9/1993 | Bernstein et al. | |
| 5,249,178 A | 9/1993 | Kurano et al. | |
| 5,253,251 A | 10/1993 | Aramaki | |
| 5,253,489 A | 10/1993 | Yoshii | |
| 5,255,291 A | 10/1993 | Holden et al. | |
| 5,260,933 A | 11/1993 | Rouse | |
| 5,260,978 A | 11/1993 | Fleischer et al. | |
| 5,268,592 A | 12/1993 | Bellamy et al. | |
| 5,268,900 A | 12/1993 | Hluchyj et al. | |
| 5,271,004 A | 12/1993 | Proctor et al. | |
| 5,274,631 A | 12/1993 | Bhardwaj | |
| 5,274,635 A | 12/1993 | Rahman et al. | |
| 5,274,643 A | 12/1993 | Fisk | |
| 5,280,470 A | 1/1994 | Buhrke et al. | |
| 5,280,480 A | 1/1994 | Pitt et al. | |
| 5,280,500 A | 1/1994 | Mazzola et al. | |
| 5,283,783 A | 2/1994 | Nguyen et al. | |
| 5,287,103 A | 2/1994 | Kasprzyk et al. | |
| 5,287,453 A | 2/1994 | Roberts | |
| 5,291,482 A | 3/1994 | McHarg et al. | |
| 5,305,311 A | 4/1994 | Lyles | |
| 5,307,343 A | 4/1994 | Bostica et al. | |
| 5,309,437 A | 5/1994 | Perlman et al. | |
| 5,311,509 A | 5/1994 | Heddes et al. | |
| 5,313,454 A | 5/1994 | Bustini et al. | |
| 5,313,582 A | 5/1994 | Hendel et al. | |
| 5,317,562 A | 5/1994 | Nardin et al. | |
| 5,319,644 A | 6/1994 | Liang | |
| 5,327,421 A | 7/1994 | Hiller et al. | |
| 5,331,637 A | 7/1994 | Francis et al. | |
| 5,345,445 A | 9/1994 | Hiller et al. | |
| 5,345,446 A | 9/1994 | Hiller et al. | |
| 5,359,592 A | 10/1994 | Corbalis et al. | |
| 5,361,250 A | 11/1994 | Nguyen et al. | |
| 5,361,256 A | 11/1994 | Doeringer et al. | |
| 5,361,259 A | 11/1994 | Hunt et al. | |
| 5,365,524 A | 11/1994 | Hiller et al. | |
| 5,367,517 A | 11/1994 | Cidon et al. | |
| 5,371,852 A | 12/1994 | Attanasio et al. | |
| 5,386,567 A | 1/1995 | Lien et al. | |
| 5,390,170 A | 2/1995 | Sawant et al. | |
| 5,390,175 A | 2/1995 | Hiller et al. | |
| 5,394,394 A | 2/1995 | Crowther et al. | |
| 5,394,402 A | 2/1995 | Ross | |
| 5,400,325 A | 3/1995 | Chatwani et al. | |
| 5,408,469 A | 4/1995 | Opher et al. | |
| 5,416,842 A | 5/1995 | Aziz | |
| 5,422,880 A | 6/1995 | Heitkamp et al. | |
| 5,422,882 A | 6/1995 | Hiller et al. | |
| 5,423,002 A | 6/1995 | Hart | |
| 5,426,636 A | 6/1995 | Hiller et al. | |
| 5,428,607 A | 6/1995 | Hiller et al. | |
| 5,430,715 A | 7/1995 | Corbalis et al. | |
| 5,430,729 A | 7/1995 | Rahnema | |
| 5,442,457 A | 8/1995 | Najafi | |
| 5,442,630 A | 8/1995 | Gagliardi et al. | |
| 5,452,294 A | 9/1995 | Natarajan | |
| 5,452,297 A | 9/1995 | Hiller et al. | |
| 5,473,599 A | 12/1995 | Li et al. | |
| 5,473,607 A | 12/1995 | Hausman et al. | |
| 5,477,541 A | 12/1995 | White et al. | |
| 5,485,455 A | 1/1996 | Dobbins et al. | |
| 5,490,140 A | 2/1996 | Abensour et al. | |
| 5,490,258 A | 2/1996 | Fenner | |
| 5,491,687 A | 2/1996 | Christensen et al. | |
| 5,491,804 A | 2/1996 | Heath et al. | |
| 5,497,368 A | 3/1996 | Reijnierse et al. | |
| 5,504,747 A | 4/1996 | Sweazey | |
| 5,509,006 A | 4/1996 | Wilford et al. | |
| 5,517,494 A | 5/1996 | Green | |
| 5,517,617 A * | 5/1996 | Sathaye et al. | ............ 709/222 |

| | | |
|---|---|---|
| 5,519,704 A | 5/1996 | Farinacci et al. |
| 5,519,858 A | 5/1996 | Walton et al. |
| 5,526,489 A | 6/1996 | Nilakantan et al. |
| 5,530,963 A | 6/1996 | Moore et al. |
| 5,535,195 A | 7/1996 | Lee |
| 5,539,734 A | 7/1996 | Burwell et al. |
| 5,541,911 A | 7/1996 | Nilakantan et al. |
| 5,546,370 A | 8/1996 | Ishikawa |
| 5,555,244 A | 9/1996 | Gupta et al. |
| 5,561,669 A | 10/1996 | Lenney et al. |
| 5,571,617 A | 11/1996 | Cooprider et al. |
| 5,583,862 A | 12/1996 | Callon |
| 5,592,470 A | 1/1997 | Rudrapatna et al. |
| 5,598,581 A | 1/1997 | Daines et al. |
| 5,600,798 A | 2/1997 | Cherukuri et al. |
| 5,602,770 A | 2/1997 | Ohira |
| 5,604,868 A | 2/1997 | Komine et al. |
| 5,608,726 A | 3/1997 | Virgile |
| 5,617,417 A | 4/1997 | Sathe et al. |
| 5,617,421 A | 4/1997 | Chin et al. |
| 5,630,125 A | 5/1997 | Zellweger |
| 5,631,908 A | 5/1997 | Saxe |
| 5,632,021 A | 5/1997 | Jennings et al. |
| 5,634,010 A | 5/1997 | Ciscon et al. |
| 5,638,359 A | 6/1997 | Peltola et al. |
| 5,644,718 A | 7/1997 | Belove et al. |
| 5,659,684 A | 8/1997 | Giovannoni et al. |
| 5,666,353 A | 9/1997 | Klausmeier et al. |
| 5,673,265 A | 9/1997 | Gupta et al. |
| 5,678,006 A | 10/1997 | Valizadeh et al. |
| 5,680,116 A | 10/1997 | Hashimoto et al. |
| 5,684,797 A | 11/1997 | Aznar et al. |
| 5,687,324 A | 11/1997 | Green et al. |
| 5,689,506 A | 11/1997 | Chiussi et al. |
| 5,694,390 A | 12/1997 | Yamato et al. |
| 5,724,351 A | 3/1998 | Chao et al. |
| 5,740,097 A | 4/1998 | Satoh |
| 5,748,186 A | 5/1998 | Raman |
| 5,748,617 A | 5/1998 | McLain, Jr. |
| 5,754,547 A | 5/1998 | Nakazawa |
| 5,761,192 A | 6/1998 | Hummel |
| 5,796,736 A | 8/1998 | Suzuki |
| 5,802,054 A | 9/1998 | Bellenger |
| 5,835,710 A | 11/1998 | Nagami et al. |
| 5,841,874 A | 11/1998 | Kempke et al. |
| 5,854,903 A | 12/1998 | Morrison et al. |
| 5,856,981 A | 1/1999 | Voelker |
| 5,892,924 A | 4/1999 | Lyon et al. |
| 5,898,686 A | 4/1999 | Virgile |
| 5,903,559 A | 5/1999 | Acharya et al. |
| 5,940,396 A | 8/1999 | Rochberger |
| 6,122,272 A | 9/2000 | Tomaszewski et al. |
| 6,167,030 A | 12/2000 | Killki et al. |
| 6,356,530 B1 | 3/2002 | Tomaszewski et al. |
| 6,611,496 B1 | 8/2003 | Tomaszewski et al. |
| 6,862,284 B1 * | 3/2005 | Spiegel et al. ........... 370/395.1 |

FOREIGN PATENT DOCUMENTS

| | | |
|---|---|---|
| EP | 0 431 751 A1 | 11/1990 |
| EP | 0567217 A2 | 10/1993 |
| WO | WO 93/07569 | 4/1993 |
| WO | WO 93/07692 | 4/1993 |
| WO | WO 94/01828 | 1/1994 |
| WO | WO 95/20850 | 8/1995 |

OTHER PUBLICATIONS

White Paper-IBM PNNI Control Point, Zurich Research Lab, pp. 1-61, Mar. 1997.*

ATM Forum User-Network Interface Specification (v.3.1) Table of Contents vii-xxv & pp. 159-164 (1995).

The ATM Forum Technical Committee, "Private-Network-Network Interface Specification Version 1.0 (PNNI 1.0)," ATM Forum document No. af-pnni-0055.000, Mar. 1996.

Bill Mayo, "Patent Declaration," The ATM Forum, http://www.atmforum.com/standards/113.html (2002).

Applicants' Statement on p. 2 of the attached Information Disclosure Statement.

Allen, M., Novell IPX Over Various WAN Media (IPXW AN), Network Working Group, RFC 1551, Dec. 1993, pp. 1-22.

Becker, D., "3c589.c: A 3c589 Etherlink3 ethernet driver for linux." becker@CESDIS.gsfc.nasa.gov, May 3, 1994, pp. 1-13.

Chowdhury, et al., "Alternative Bandwidth Allocation Algorithms for Packet Video in ATM Networks," INFOCOM 1992, pp. 1061-1068.

Doeringer, W., "Routing on Longest-Matching Prefixes," IEEE/ACM Transactions in Networking, vol. 4, No. 1, Feb. 1996, pp. 86-97.

Esaki, et al., "Datagram Delivery in an ATM-Internet," 2334b IEICE Transactions on Communications, Mar. 1994, No. 3, Tokyo, Japan.

IBM Corporation, "Method and Apparatus for the Statistical Multiplexing of Voice, Data and Image Signals," IBM Technical Disclosure Bulletin, No. 6, Nov. 1992, pp. 409-411.

Pei, et al., "Putting Routing Tables in Silicon," IEEE Network Magazine, Jan. 1992, pp. 42-50.

Perkins, D., "Requirements for an Internet Standard Point-to-Point Protocol," Network Working Group, RFC 1547, Dec. 1993, pp. 1-19.

Simpson, W., "The Point-to-Point Protocol (PPP)," Network Working Group, RFC 1548, Dec. 1993, pp. 1-53.

Tsuchiya, P.F., "A Search Algorithm for Table Entries with Non-Contiguous Wildcarding," Abstract, Bellcore.

Zhang, et al., "Rate-Controlled Static-Priority Queueing," INFOCOM 1993, pp. 227-236.

William Stallings, Data and Computer Communications, pp. 329-333, Prentice Hall, Upper Saddle River, New Jersey 07458.

Updated Applicants' Statement on p. 2 of the attached Information Disclosure Statement.

ATM Forum Private Network-Network Interface Specification (1.0) www.ATMForum.com, 385 pgs.

* cited by examiner

FORMAT FOR AUTOMATIC GENERATION OF UNIQUE ATM ADDRESSES USED FOR PNNI

The present patent application is a Divisional of prior application Ser. No. 08/876,952, filed Jun. 17, 1997 now U.S. Pat. No. 6,862,284, entitled FORMAT FOR AUTOMATIC GENERATION OF UNIQUE ATM ADDRESSES USED FOR PNNI.

BACKGROUND OF THE INVENTION

1. Field of the Invention

The invention relates to a format for automatic generation of unique ATM addresses used for PNNI.

2. Related Art

In known ATM systems, each node performing the PNNI protocol must be assigned a unique 20-byte ATM address in a standard format specified by the ATM Forum User-Network Interface Specification (Presently version 3.1). The "PNNI protocol" refers to the protocol specified by the ATM Forum Private Network—Network Interface Specification (presently version 1.0).

One technique for assigning unique addresses for nodes in an ATM network is to assign them manually, thus assuring that each address is unique and also that the nodes form peer groups as desired by the operator configuring the ATM network. However, this technique can be tedious, particularly for ATM networks which include a relatively large number of nodes.

Accordingly, it would be advantageous to provide a method and system for assigning ATM addresses automatically, which by default causes similar devices (such as those from the same manufacturer) to be configured in the same peer group for PNNI protocol purposes. This advantage is achieved in an embodiment of the invention in which a first portion of an ATM address is set to a value unique to the manufacturer (or otherwise unique to a selected class of devices), while a second portion of the ATM address is set to a value unique to the specific device.

SUMMARY OF INVENTION

The invention provides a method and system for providing unique ATM End System Addresses, in which each new device is assigned a unique address in an ATM network while allowing all new devices performing the PNNI protocol in a selected set (such as all those from a single manufacturer) to be assigned by default to the same peer group. In the invention, a first portion of the ATM address (from which the default peer group ID is determined) is by default configured to equal a selected value unique to the manufacturer (or another selected class of devices), which assures that all devices from the same manufacturer (or in that selected class) are by default configured in the same peer group for PNNI protocol purposes, while a second portion of the ATM address (comprising a switch number ID) and a third portion of the ATM address (comprising a device number ID) are by default both configured to equal a unique value for the device (such as a MAC address), which assures that each device is configured with a unique ATM address. In alternative embodiments, the third portion of the ATM address may be determined using a different method, so long as selection of the third portion causes each device to be assigned a unique ATM address by default.

DETAILED DESCRIPTION OF THE PREFERRED EMBODIMENT

Figure 1:
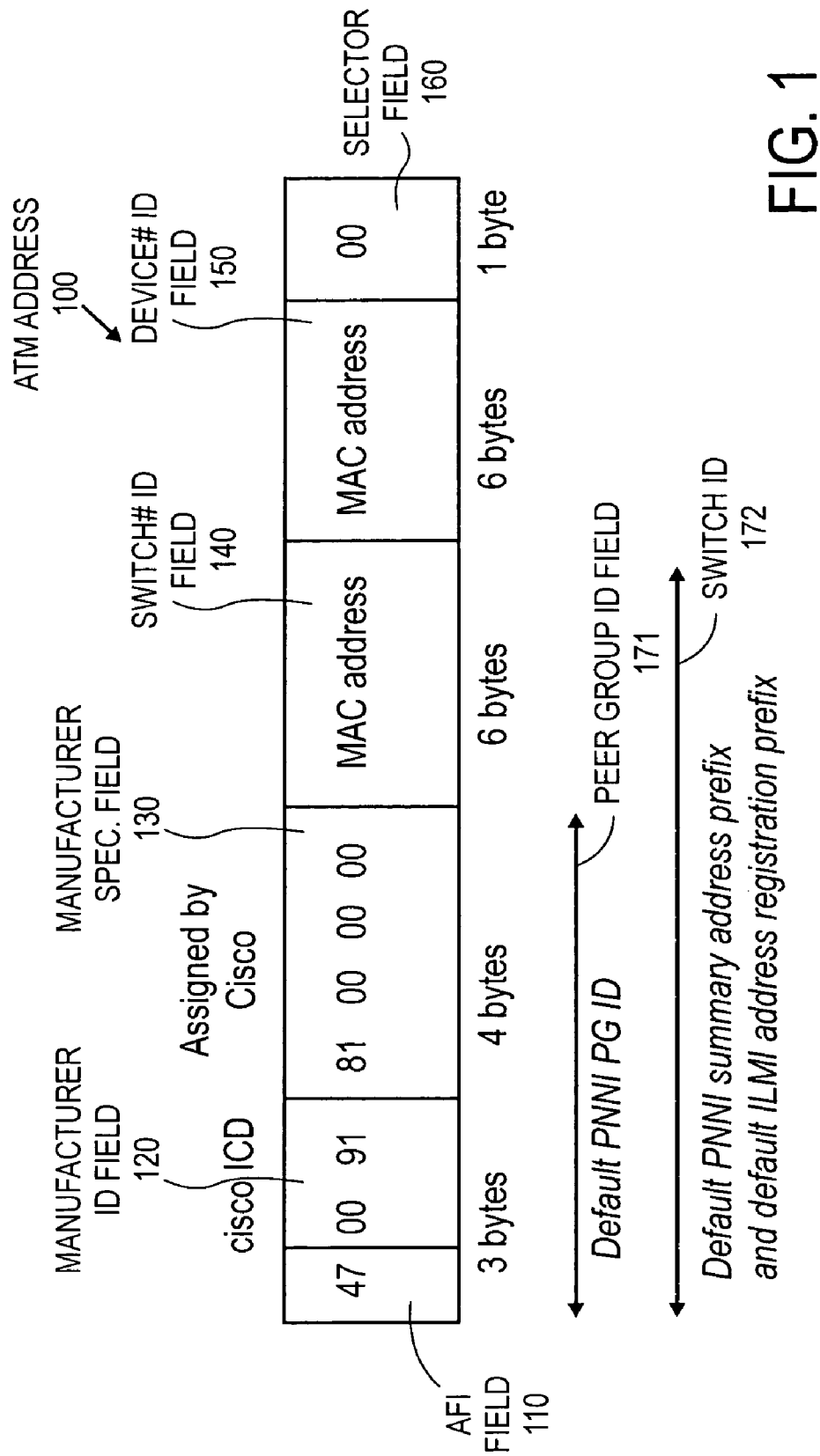
FIG. 1 shows a data structure diagram of an autoconfigured address in an ATM network.

In the following description, a preferred embodiment of the invention is described with regard to preferred process steps and data structures. Those skilled in the art would recognize after perusal of this application that embodiments of the invention can be implemented using general purpose switching processors or special purpose switching processors or other circuits adapted to particular process steps and data structures described herein, and that implementation of the process steps and data structures described herein would not require undue experimentation or further invention.

Inventions described herein can be used in conjunction with inventions described in the following applications:

Application Ser. No. 08/862,915, filed May 23, 1997, Express Mail Mailing No. EM302071674US, in the same inventors, titled "Next Hop Selection In ATM Networks"; and Application Ser. No. 08/863,031, filed May 23, 1997, Express Mail Mailing No. EM302071665US, in the name of the same inventor(s), titled "Call size Feedback on PNNI Operation".

These applications are hereby incorporated by reference as if fully set forth herein.

Autoconfigured ATM Address

FIG. 1 shows a data structure diagram of an autoconfigured address in an ATM network.

An autoconfigured ATM address 100 comprises a 20-byte ATM address value, including an AFI field 110, a manufacturer ID field 120, a manufacturer-specific field 130, a switch number ID field 140, a device number ID field 150, and a selector field 160. The ATM address 100 is an ATM End System Address as defined in Section 5.1.3.1 of the ATM Forum User-Network Interface Specification (version 3.1).

The AFI field 110 comprises a single byte (each byte comprises one octet) and has the value hexadecimal 47. This value indicates that ATM addresses are assigned in conformity with the ICD (International Code Designator) format. In alternative embodiments, ATM addresses may be assigned in conformity with other formats, such as the DCC (Data Country Code) or E.164 formats.

The manufacturer ID field 120 comprises two bytes and has a value which is specific to a manufacturer of the specific device, as specified by the ATM address authority associated with the selected value on the AFI field 110; for the ICD format that authority is the British Standards Institute. In a preferred embodiment, the value hexadecimal 00 91 is reserved for products manufactured by Cisco Systems, Inc. of San Jose, Calif. There is no special significance to this specific value; it is simply the value which is assigned to the manufacturer by the ATM address authority associated with the value hexadecimal 47 in the AFI field 110.

The manufacturer-specific field 130 comprises four bytes and has a value assigned by the manufacturer. In a preferred embodiment, when the manufacturer is Cisco Systems, Inc., of San Jose, Calif., this value is uniformly selected to be hexadecimal 81 00 00 00. There is no special significance to the special value, which could be any selected value so long as maintained consistent across devices manufactured by the same manufacturer.

Collectively, the first seven bytes of the ATM address 100 (the AFI field 110, the manufacturer ID field 120, and the manufacturer-specific field 130) comprise a peer group ID field 171 used in PNNI protocols for ATM routing. This peer group ID field 171 is only seven bytes, not the 14 bytes which are used for PNNI routing in known ATM networks to determine the default peer group ID. The level value is set accordingly to 56 bits to indicate only a seven byte peer group ID field 171. Those devices which have the same value in the peer group ID field 171 are treated as members of the same peer group for PNNI protocol purposes. Because those devices manufactured by the same manufacturer have the same value in the peer group ID field 171, they are thus configured by default all in the same peer group for protocol purposes.

In alternative embodiments, a single manufacturer may provide devices which are autoconfigured to have differing values for the manufacturer-specific field 130, such as for example hexadecimal 81 00 00 00 for a first set of devices and hexadecimal 81 00 00 01 for a second set of devices. The first set of devices would thus be configured by default in a first peer group, while the second set of devices would thus be configured by default in a second peer group distinct from the first peer group. There is no special significance to these specific values, which could be any selected values so long as maintained consistent across sets of devices manufactured by the same manufacturer.

The switch number ID field 140 comprises six bytes and has a value equal to a MAC address for the device. In alternative embodiments, the switch number ID field 140 may be configured to equal a different unique value for the device.

Although in a preferred embodiment, a switch is typically a single device, a switch may also comprise a plurality of devices comprising a switching system, such as a set of one or more physical devices acting together as a single PNNI network management entity. A switching system generally includes one or more lowest-level nodes and, when acting as a PGL (peer group leader) in the PNNI protocol, also includes one or more LGNs (logical group node). A switching system can include a plurality of lowest-level PNNI nodes, and in such cases, each node could have a different ATM address.

Collectively, the first 13 bytes of the ATM address 100 (the AFI field 110, the manufacturer ID field 120, the manufacturer-specific field 130, and the switch number ID field 140) comprise a switch ID 172 used in PNNI protocols for ATM routing. Because the MAC address (or other selected unique value) for the device is unique, the switch ID 172 is therefore unique to the switch. An end system which is coupled to the device, and thus to the ATM network, uses the switch ID 172 supplied by the switch, together with a unique ESI (End System Identifier) assigned to the end system, plus a selector byte, to determine a unique ATM address for the end system.

The device number ID field 150 comprises six bytes and also has a value equal to a MAC address for the device. In alternative embodiments, the device number ID field 150 may be configured to equal a different unique value for the device. Because the MAC address (or other selected unique value) for the device is unique, the ATM address 100 is therefore unique to the device.

The selector field 160 comprises one byte and has the value hexadecimal 00. There is no special significance to this specific value, which could be any selected value.

When the device is coupled to an ATM network, the ATM address 100 is autoconfigured to the values shown herein. The ATM address 100 can be modified by an operator to take on a different value if the autoconfigured value is not advantageous.

ALTERNATIVE EMBODIMENTS

Although preferred embodiments are disclosed herein, many variations are possible which remain within the concept, scope, and spirit of the invention, and these variations would become clear to those skilled in the art after perusal of this application.

The invention claimed is:

1. A method, comprising:
  assigning a private network—network interface (PNNI) peer group identification to a device to be coupled with an asynchronous transfer mode (ATM) network based on a manufacturer of the device and a product group to which the device belongs; and
  auto-configuring the device at a point of manufacture with an ATM address using the assigned PNNI peer group identification.

2. The method of claim 1, wherein the PNNI peer group identification includes a two bit field indicating manufacturer.

3. The method of claim 1, wherein the PNNI peer group identification includes a four bit field indicating product group.

4. The method of claim 1, wherein the ATM address includes a switch identification field identifying a switch to which the device will be connected or a default switch.

5. The method of claim 4, wherein the switch identification field can be altered at a point of installation.

6. The method of claim 4, wherein the switch identification field consists of a media access control (MAC) address.

7. The method of claim 4, wherein the switch identification field consists of six bytes.

8. The method of claim 1, wherein the ATM address includes a device identification field unique to the device.

9. The method of claim 8, wherein the device identification field can be altered at a point of installation.

10. The method of claim 8, wherein the device identification field consists of a media access control (MAC) address.

11. The method of claim 8, wherein the device identification field consists of six bytes.

12. A machine-readable storage medium tangibly embodying a sequence of instructions executable by a machine to perform a method comprising:
  assigning a private network—network interface (PNNI) peer group identification to a device to be coupled with an asynchronous transfer mode (ATM) network based on a manufacturer of the device and a product group to which the device belongs; and auto-configuring the device at a point of manufacture with an ATM address using the assigned PNNI peer group identification.

13. The machine-readable storage medium of claim 12, wherein the PNNI peer group identification includes a two bit field indicating manufacturer.

14. The machine-readable storage medium of claim 12, wherein the PNNI peer group identification includes a four bit field indicating product group.

15. The machine-readable storage medium of claim 12, wherein the ATM address includes a switch identification field identifying a switch to which the device will be connected or a default switch.

16. The machine-readable storage medium of claim 15, wherein the switch identification field can be altered at a point of installation.

17. The machine-readable storage medium of claim 15, wherein the switch identification field consists of a media access control (MAC) address.

18. The machine-readable storage medium of claim 15, wherein the switch identification field consists of six bytes.

19. The machine-readable storage medium of claim 12, wherein the ATM address includes a device identification field unique to the device.

20. The machine-readable storage medium of claim 19, wherein the device identification field can be altered at a point of installation.

21. The machine-readable storage medium of claim 19, wherein the device identification field consists of a media access control (MAC) address.

22. The machine-readable storage medium of claim 19, wherein the device identification field consists of six bytes.

* * * * *